United States Patent [19]

Boffelli

[11] Patent Number: 4,572,343

[45] Date of Patent: Feb. 25, 1986

[54] ELECTROMAGNETIC FRICTION CLUTCH

[75] Inventor: Pier C. Boffelli, San Donato, Italy

[73] Assignee: Baruffaldi Frizioni S.p.A., Milano, Italy

[21] Appl. No.: 603,129

[22] Filed: Apr. 23, 1984

[30] Foreign Application Priority Data

Apr. 27, 1983 [IT] Italy ............................. 20799 A/83

[51] Int. Cl.[4] .................... F16D 7/02; F16D 23/00; F16D 43/20
[52] U.S. Cl. ................... 192/56 R; 192/48.2; 192/48.8; 192/84 C; 192/150
[58] Field of Search ............... 192/56 R, 56 C, 84 A, 192/84 C, 48.8, 48.2, 150

[56] References Cited

U.S. PATENT DOCUMENTS

| | | | |
|---|---|---|---|
| 3,584,715 | 6/1971 | Miller | 192/56 R |
| 3,650,362 | 3/1972 | Davidson | 192/56 R |
| 4,340,133 | 7/1982 | Blersch | 192/56 R X |

Primary Examiner—Edward G. Favors
Attorney, Agent, or Firm—Karl F. Ross; Herbert Dubno

[57] ABSTRACT

This invention describes a clutch device with automatic disengagement in case of overloading, useful especially for the rear power take-offs of agricultural tractors, which can be inserted in a conventional clutch casing, replacing the flywheel and the mechnical clutch of the power take-off, in which means exist for commanding the automatic disengagement of the clutch by detecting variations in magnetic flux which occur in the case of slip between the rotor and the armature of the clutch.

15 Claims, 5 Drawing Figures

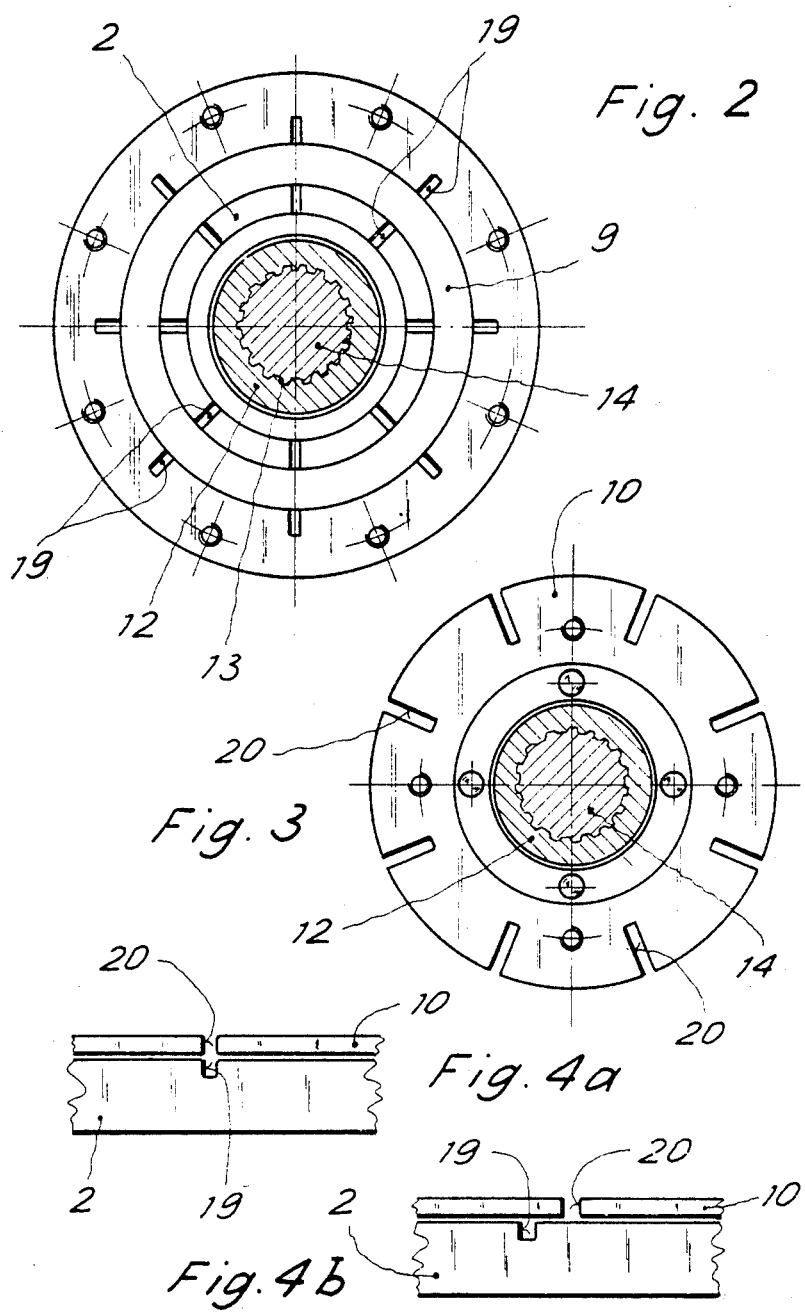

ELECTROMAGNETIC FRICTION CLUTCH

BACKGROUND OF THE INVENTION

This invention relates to improvements in electromagnetic clutches and is particularly, but not exclusively, suitable for vehicles intended to provide an additional or auxiliary drive output to an auxiliary piece of equipment.

Conventional agricultural tractors, for example, are normally equipped with a rear power take-off, provided by a shaft which can be drivenly connected to the engine, and which can be used for operating numerous auxiliary devices and equipment, such as revolving harrows, cutters, mowing machines, drills, pumps and the like, towed by the tractor.

The use of such auxiliary devices, nevertheless, is frequently associated with disadvantages due, for example, to irregularity of the ground, which can contain stones, roots and the like and against which the devices can jam. For preventing such obstacles from causing breakages of the shaft of the power take-off, which is frequently of limited cross-section, clutches are usually employed for coupling such a shaft to the engine, which clutches slip at a load less than that which is dangerous for said shaft.

If this slip is then not signalled to the driver, overheating of the clutch occurs and this can result in irreparable damage.

To protect the clutch, therefore, it is necessary to use a coupling means which, in the case where the maximum transmissible torque is exceeded or in the case where the clutch slips, automatically causes disengagement of the clutch.

BRIEF SUMMARY OF INVENTION

A coupling means which can replace the clutch normally used for coupling the power take-off to the engine without substantial modifications to the geometry of the transmission components of the tractors on which it is mounted is highly desirable.

These and other problems are resolved by the present electromagnetic friction clutch device with automatic disengagement in case of overload, especially for auxiliary power take-offs of agricultural machines, which comprises of an electromagnetic clutch, of which the drive plate or rotor, connected to the shaft of the engine has a sufficient moment of inertia and mass to constitute the flywheel of said engine, electromagnetic means being present adapted for detecting the variations in reluctance and magnetic flux which arise in the case of slip between the rotor and driven plate or armature of the clutch, and means for causing the disengagement of the clutch itself in the case of slip of a value exceeding a predetermined value, said means desirably being capable moreover of preventing engagement of the clutch itself with the engine in an unsuitable operating regime.

In one especially suitable embodiment, the rotor is shaped to accommodate within its overall dimensions an electromagnet for actuating said clutch, and there is present, in front of the front surface of said rotor, an annular armature resiliently connected to the auxiliary driven shaft for the auxiliary power take-off of the vehicle, wherein the entire device may have overall dimensions not exceeding those of the flywheel and the conventional clutch which is completely replaces. In particular said means for sensing said variations in magnetic reluctance and flux are provided by a coil linked to the magnetic circuit of the clutch, which coil is connected to electrical or electronic means adapted to detect currents induced in said coil during the slip and for commanding the disengagement of the electromagnetic clutch.

According to one embodiment, the sensing coil linked to the magnetic circuit of the clutch may be the energising coil itself for the engagement electromagnet of the clutch. In an alternative, if required, the sensing coil linked to the magnetic circuit of the clutch may be an auxiliary coil adjacent to the energising coil for the engagement electromagnet of the clutch.

With advantage the rotor and the armature are provided respectively with corresponding radial notches or slots which when relative slip occurs, produce a variation in the air gap in the magnetic circuit, thus producing the changes in the reluctance and magnetic flux.

Where the sensitivity of said means for sensing and controlling permits it, the rotor and the armature can be without notches, slots or the like, a variation in the air gap in the magnetic circuit being produced, when relative slip between armature and rotor occurs, by the loss of contact between the armature and the rotor which takes place during such slippage. The sensing means include electrical or electronic means which cause the deenergizing of the electromagnet when angular slip occurs with a velocity or duration exceeding a predetermined value.

Furthermore, if it is considered desirable, governing means may comprise means for inhibiting the excitation of said electromagnet and therefore the engagement of the clutch when the rotational speed of the engine exceeds a predetermined value, said means being sensitive to the difference in angular velocities between the rotor and the armature during the phase of engagement of the clutch, and wherein also said governing means may comprise means for imposing a delay time before allowing engagement of the clutch when the latter has been disengaged automatically by excessive slip.

A more detailed description of the characteristics of the present invention in one of its forms of embodiment will now be described by way of example, reference being made to the accompanying drawings.

BRIEF DESCRIPTION OF DRAWINGS

FIG. 2 a section along the line II—II of FIG. 1;

FIG. 3 a section along the line III—III of FIG. 1; and

FIGS. 4a and 4b illustrate two different angular positions of armature and rotor.

Figure 1:
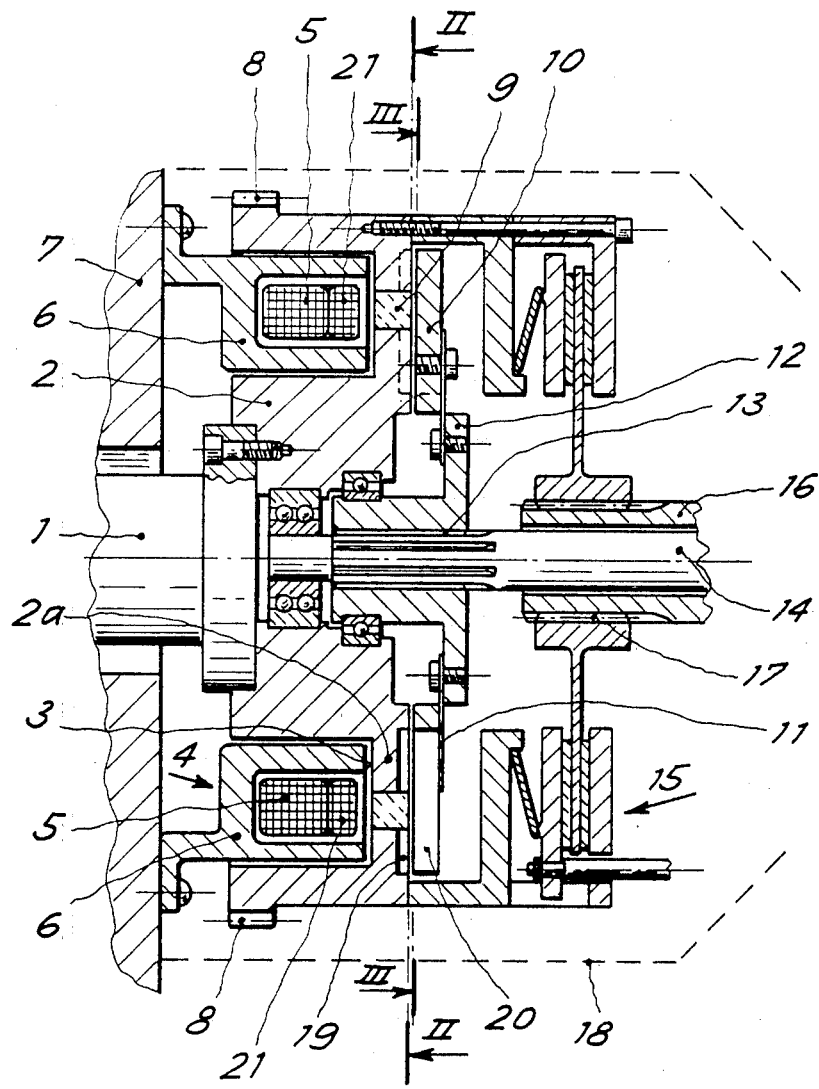
FIG. 1 a sectional view of a clutch assembly according to the present invention.

As can be seen in FIG. 1 an engine or drive shaft 1 is fixedly connected to the first plate or rotor 2 of an electromagnetic clutch. The rotor 2 is of such dimensions as to act as a replacement for an existing flywheel, possessing an equivalent moment of inertia and mass. The rear face of the rotor 2 is formed with an annular 3, in which is seated an electromagnet 4, composed of an excitation coil 5 within an associated magnetic core 6, the electromagnet 4 being connected to an external fixed structure 7 of the engine. The rotor 2 has a peripheral toothed ring 8, for coupling to a starter motor (not shown) and has the inserts 9 of friction material in its front face.

Opposed to the front face of the rotor 2 is a metal disc or armature 10, connected by means of a resilient plate 11 to a flanged sleeve 12, which is splined internally at 13 and which is drivingly connected through these splines to an auxiliary driven shaft 14, leading to the rear power take-off of the vehicle. The rotor 2 also forms part of a mechanically operable friction clutch 15 with at least one friction disc, for example, as illustrated, which clutch 15 connects the rotor 2 and the main drive shaft 1 to a hollow transmission shaft 16 connected to the friction disc by means of the splined coupling 17; the transmission shaft 16 in the main driven shaft which drives the transmission system of the tractor. As can be seen, the rotor 2, the armature 10, the flanged sleeve 12, the friction disc, the transmission shaft 16 and the splined coupling are coaxial. The auxiliary driven shaft 14 passes with clearance through the transmission shaft 16. Also, the armature 10 is disposed adjacent to the front face of the rotor 2 and between that front face and the friction disc.

The energizing of the coil 5 of the electromagnet 4 produces a magnetic field, which attracts the metal armature 10, deforming the resilient plate 11, and presses the armature 10 against the front face of the rotor 2 with a sufficient force to transmit to the auxiliary shaft 14 the working torque for which the shaft 14 is designed.

If the electromagnet 4 is de-energized, the resilience of the plate 11 ensures complete breakaway and disengagement of the armature 10 from the rotor 2 and reliable disengagement of the engine from the power take-off.

The entire clutch assembly is contained within a clutch casing 18 and ordinarily does not require overall dimensions greater than those of traditional clutch assemblies of the mechanical type so that it may readily replace such traditional assemblies.

In the embodiment illustrated, the pole pieces (not shown) of the rotor 2 are formed with radial notches 19, and corresponding slots 20 are provided in the armature 10, as can more easily be seen in FIGS. 2 and 3.

Said slots and notches have a restricted width and define several discontinuities in the air gap. As can be seen in FIGS. 4a, 4b such slots and notches can be situated opposite to one another, or may be in different relative positions, thus giving rise to different facing polar areas.

In fact, in the case of FIG. 4a, the polar area is reduced by the area of the slots 20 coincident with the notches 19, whereas in FIG. 4b the case is illustrated in which the polar area is reduced by the area of the slots 20 and that of the notches 19, no longer superimposed upon one another.

During slipping, therefore, a variation occurs in the reluctance of the magnetic circuit and therefore a variation in the strength of the magnetic flux in the magnetic circuit composed of the electromagnet 4, the rotor 2 and the armature 10.

Such variations in flux, which are found in correspondence with angular slip between the rotor and the armature, can be detected by an auxiliary sensing coil 21, adjacent to the energizing coil 5 and therefore linked with the flux of the magnetic circuit. In this auxiliary sensing coil 21, therefore, an electromagnetic force is produced, which is proportional to the relative velocity between the armature 10 and the rotor 2, to the number of notches and slots and to their amplitude and to the number of turns of the coil 21. The current passing through the coil 21 can be sensed and utilized to actuate control devices which determine the intervention of the protective safety systems in the case where said angular slip takes place at a velocity greater than a predetermined value of continues beyond a predetermined period of time, which itself also may be regulated.

Such safety systems can therefore cause the disengagement of the clutch in the case of excessive slip between the rotor and the armature (to prevent damage to the clutch itself).

It is likewise possible, according to this invention, with an amplification and control circuit for the disengagement of the clutch of greater sensitivity, to detect the variation in the magnetic flux caused by the increase in the air gap which takes place when, the maximum transmissible torque having been exceeded, the clutch having both the armature and the rotor without any slots or notches, slips and an increase in distance takes place between the opposed polar surfaces of the armature and the rotor due to the roughness of the surfaces themselves and to the possible formation of dust of abraded material. The variation in magnetic flux due to slip between the armature and the rotor, particularly sensitive in the case where notches and slots are present, is also detectable by means of the energizing coil 5 itself, without requiring the use of the auxiliary sensing coil 21.

There is therefore a safety system which guarantees both the protection of the power take-off shaft and the equipment and devices connected to it, as a result of the slip of the associated clutch, which is arranged to slip in correspondence with a torque loading less than the breakage loading of the take-off shaft, and the protection of the clutch itself, its disengagement taking place automatically in the case of excessive slip before it becomes damaged.

Overloading of the clutch of the power take-off can also arise due to clutch engagement when the engine is revolving at an excessive speed; it is then possible to provide means adapted to detect the value of the electromotive force which is induced in the sensing auxiliary coil or in the principal energizing coil itself during the engagement phase, while the armature and the rotor are still separated, which electromotive force is a function of the difference in angular velocity between the rotor and the armature. Such means is then able to control the inhibiting of the energizing of the electromagnet when said difference in velocity exceeds a predetermined value, that is to say when the engine is running at too high a speed, obliging the user to bring the engine down to a speed suitable for engaging the clutch, so that the transmission will not be damaged.

It may furthermore be advantageous to provide, associated with said governing or control devices, an electrical or electronic apparatus which imposes, each time that the automatic disengagement of the clutch due to overload has taken place, a delay time before further clutch engagement becomes possible, so that the driver becomes aware of the problem and removes the cause of the overload which has caused the disengagement. It is therefore possible to fit the device according to this invention to motor vehicles such as, for example, agricultural tractors, without the need to carry out modifications to the transmission equipment, in view of the fact that the apparatus according to this invention can completely replace both the usual mechanical clutch and also the flywheel, having the same overall dimensions as these. The control and governing devices, which receive and if necessary amplify the currents generated by the coil 5 or by the coil 21 in the case of slip of the clutch, and which govern the disengagement of same when a predetermined threshold value is exceeded, can be realized in various ways, either electrical or electronic, and they are therefore not described here in detail, since they may be of known type. The electromagnetic friction clutch according to this invention, without the mechanically operable friction clutch 15, may also be used for connecting the main power take-off shaft of the tractor to the engine; to provide protection against slip.

Other fields of use of this invention also comprise all those cases in which a sudden disengagement of the coupling clutch, when its slip occurs, assures effective protection to the clutch itself and to the devices which it couples, without rendering necessary the use of other protective devices.

It is evident to the technical person in this field that the invention may be used either for single-plate clutches, or for multiple-disc clutches, for dog clutches and for slip ring clutches, and also for permanent magnet clutches, depending upon the requirements which apply.

Numerous variations can be introduced into the individual practical applications of the device according to the present invention, without thereby departing from the scope of the present invention.

We claim:

1. An electromagnetic friction clutch comprising a driving motor having a sufficient moment of inertia and mass to constitute a flywheel, an armature frictionally engageable with said rotor in driven relationship, electromagnetic control means operable to engage said armature with said rotor and electromagnetic sensor means responsive to changes in reluctance and magnetic flux resulting from slip between said rotor and said armature to disengage said armature from said rotor when said changes exceed a predetermined value.

2. An electromagnetic friction clutch according to claim 1 in which said electromagnetic sensor means is responsive to the speed of rotation of said rotor and operable when said rotor and said armature are disengaged to inhibit said electromagnetic control means when said speed of rotation of said rotor exceeds a predetermined value.

3. An electromagnetic friction clutch according to claim 1 including a driven member and resiliently deformable means connecting said armature to said driven member for displacement towards and away from said rotor and wherein said rotor has a forward driving face engageable by said armature and an opposed rear face, an annular recess is formed in said rear face, said electromagnetic control means is disposed at least in part in said annular recess and said armature is of annular configuration.

4. An electromagnetic friction clutch according to claim 3 in which said driven member is a flanged sleeve formed internally with key means for driving connection to an auxiliary driven shaft.

5. An electromagnetic friction clutch according to claim 4 in which said rotor additionally forms part of a mechanically operable friction clutch incorporating at least one friction disc coaxially disposed with respect to said flanged sleeve and in which is included a splined coupling for drivingly connecting said friction disc to a main driven shaft.

6. An electromagnetic clutch according to claim 3 in which said electromagnetic sensor means is disposed in said annular recess.

7. An electromagnetic clutch according to claim 1 in which such electromagnetic sensor means comprises a coil disposed within the body of the rotor.

8. An electromagnetic clutch according to claim 7 in which said electromagnetic control means comprises an actuating coil and said actuating coil is common to both said electromagnetic control means and said electromagnetic sensor means.

9. An electromagnetic clutch according to claim 1 in which said rotor and said armature are provided with corresponding radial notches operable to produce a change in the air gap of the magnetic circuit upon slip between said rotor and said armature and generate said changes in reluctance and magnetic flux.

10. An electromagnetic clutch according to claim 1 in which said electromagnetic sensor means is responsive to changes in reluctance and magnetic flux resulting from changes in the air gap of the magnetic circuit due to loss of contact between said armature and said rotor.

11. An electromagnetic clutch according to claim 1 in which said electromagnetic sensor means is responsive to the duration of said changes in reluctance and magnetic flux to de-energize said electromagnetic control means when said duration exceeds a predetermined value.

12. An electromagnetic clutch according to claim 1 including means responsive to disengagement of said rotor and said armature by said electromagnetic sensor means to prevent said electromagnetic control means being energized for a predetermined delay time.

13. A friction clutch for drivingly connecting a drive shaft to a main driven shaft and to an auxiliary driven shaft, said clutch comprising:

(a) a rotor having a moment of inertia and a mass sufficient to act as a flywheel;

(b) an annular armature coaxially disposed with respect to said rotor and opposed to one face of said rotor to comprise with said rotor an electromagnetic clutch;

(c) a flanged sleeve coaxially disposed with respect to said armature and splined internally;

(d) resilient means connecting said armature to said flanged sleeve for axial displacement of said armature into and out of driven engagement with said one face of said rotor;

(e) electromagnetic control means carried on said rotor and energisable to generate a magnetic flux to displace said armature into driven engagement with said rotor;

(f) at least one friction disc coaxially disposed with respect to said rotor and axially spaced from said one face thereof with said armature disposed between said one face and said friction disc, said friction disc being in cooperating relationship with said rotor to provide a mechanically operable friction clutch;

(g) a splined coupling connecting said main driven shaft to said friction disc, said main driven shaft being hollow;

(h) said auxiliary driven shaft extending through said hollow main driven shaft and being drivenly connected to the internally splined driven member; and (i) electromagnetic sensor means carried on said rotor and responsive to changes in reluctance and magnetic flux resulting from slip between said rotor and said armature to disengage said armature from said rotor when said changes exceed a predetermined value.

14. A clutch according to claim 13 in which said rotor and said armature are formed with corresponding radial slots to increase the changes in reluctance and magnetic flux resulting from slip between said rotor and said armature.

15. A clutch according to claim 13 in which said one face of said rotor is provided with inserts of friction material.

* * * * *